Patented Jan. 14, 1947

2,414,413

UNITED STATES PATENT OFFICE 2,414,413

SELENIUM-CONTAINING GLASS

Arnold E. Pavlish and Chester R. Austin, Columbus, Ohio, assignors to Battelle Memorial Institute, Columbus, Ohio, a corporation of Ohio No Drawing. Application July 28, 1942,
Serial No. 452,620

18 Claims. (Cl. 106—52)

Our invention relates to selenium-containing glass. It has to do, more particularly, with a method of and means for retaining selenium in glass during processing from the batch state to the time of fabrication of the final article. It has to do, more specifically, with the addition of reducing agents, such as silicon, silicides or alloys containing silicon, to the glass batch which aid in the retention of selenium during the melting and fining operations.

Selenium is used in the glass industry as a decolorizer, usually in conjunction with cobalt oxide, to neutralize the greenish tint resulting from iron oxide in the glass, for producing selenium pink glass; and, in conjunction with other ingredients, for the production of selenium ruby or other colored glasses. The amount of selenium commonly added for decolorization is 0.1 to 0.3 pound per ton of glass; for pink glass about 2 to 3 pounds per ton of glass; for ruby colored glass about 20 pounds per ton of glass; and for other colored glasses from 0.5 to 20 pounds per ton of glass, depending upon the particular color or shade desired.

With the standard methods of adding selenium to glass batches, a large percentage of the selenium volatilizes and is lost in the melting and fining operations. Therefore, an appreciable excess of selenium must be added originally to the batch in order to have the desired amount in the final glass. This is true regardless of the form in which the selenium is added.

Because of the large amount of selenium used in selenium ruby glass, it is of special importance to retain the selenium incorporated in a glass batch used for making this type of glass. Virtually all commercial selenium ruby glasses are made in pots or in small day tanks where the selenium losses are less than in the large, usually more economical, open-flame continuous tank melting units. It is also quite common to use expensive base glasses, containing zinc oxide, for this kind of glass owing to the fact that these base glasses will better retain the selenium.

It is under these conditions that it is necessary to add 20 pounds or more of selenium per ton of glass batch to obtain the necessary selenium retention for selenium ruby glass production. Analyses of commercial ruby glasses, however, show that the selenium content seldom exceeds 0.2 per cent and is frequently much lower.

One of the objects of our invention is to minimize the loss of selenium from glass batches during the melting and fining operations.

Another object of our invention is to provide a glass batch for use in the production of selenium-containing glass, particularly selenium ruby glass, which is of such a nature that it can be melted and fined in continuous tank units without excessive loss of selenium.

Another object of our invention is to provide a glass batch of the nature indicated in the preceding paragraph and wherein it is not necessary to use expensive base glasses in order to retain the selenium.

Still another object of our invention is to retain selenium effectively in glass batches without depending upon a reducing gaseous atmosphere in the furnace above the glass during the melting and fining operations.

We have found that substantial economies in selenium requirement can be realized by adding small percentages of silicon, silicides, or alloys containing silicon, along with the selenium in the glass batch. The addition of any of these substances results in increased selenium recovery. In addition to increasing selenium recovery, silicon additions also make the production of selenium-containing glass, particularly selenium ruby glass, in continuous tanks economically feasible. Furthermore, it is not necessary to use expensive base glasses, for the purpose of more effectively retaining the selenium, in producing the selenium-containing glass.

Only small percentages of silicon are required to produce the desired effect. The data given in the following table, show the improvements in selenium recoveries obtained by introducing silicon-containing materials into the glass batch along with the selenium addition.

*Effect of silicon additions on selenium recovery*

| Test No. | Colorant[1] per cent | | Silicon addition | | | Selenium in glass, per cent | Selenium recovery, per cent |
|---|---|---|---|---|---|---|---|
| | Se | CdS | Kind | Per cent | Silicon content, per cent | | |
| 83 | 1.0 | | | | | 0.01 | 1.0 |
| 84 | 1.0 | | Si | 0.25 | 0.25 | .66 | 61.0 |
| | 1.0 | 0.6 | | | | .013 | 1.2 |
| 1 | 1.0 | .6 | FeSi | 1.0 | .90 | .77 | 71.0 |
| 2 | 1.0 | .6 | SiC | 1.0 | [2].70 | .53 | 48.9 |
| 3 | 1.0 | .6 | CaSi | 1.0 | .601 | .46 | 42.4 |
| 4 | .35 | .35 | FeSi | .125 | .112 | .04 | 10.5 |
| 25 | .35 | .35 | TiSi | .34 | .136 | .09 | 23.7 |
| 31 | .35 | .35 | FeSi | .18 | .162 | .07 | 18.4 |
| 81 | .35 | .35 | CaAlSi | .42 | .202 | .15 | 39.5 |
| 28 | .35 | .35 | FeSi | .25 | .225 | .18 | 47.4 |
| 82 | .35 | .35 | ZrSi | .53 | .295 | .26 | 68.5 |
| 30 | .20 | .20 | FeSi | .30 | .27 | .16 | 14.7 |
| 35 | .20 | .20 | CaSi | .73 | .44 | .20 | 92.1 |

[1] Based on weight of glass batch.
[2] Theoretical silicon content.

The above data were obtained from glasses made by pouring 500-gram batches into crucibles at 2700° F., the batches being heated to 2700° F., held approximately two hours at that temperature, and poured out or fabricated into glass articles.

Various forms of silicon can be used to retain selenium effectively, as shown in the foregoing table, but the effectiveness varies with the particular form in which the silicon is added. Metallurgical ferro-silicon, 90 percent grade, is particularly advantageous from the standpoints of cost, ease of handling, and availability.

We prefer to add silicon in amounts ranging from 0.10 to 1 percent by weight regardless of the form in which it is added. The amount of reducing agent added, however, depends upon the amount of selenium added to the batch as well as upon the amount of selenium desired in the final glass. The selenium present in the glass batch will usually range from effective amounts up to 1 percent by weight.

The glass batches used in the tests referred to in the above table were the ordinary soda-lime-silica types. The usual range of base glass composition which may be used in this invention is about as follows:

| Ingredient | Weight, percent |
|---|---|
| $SiO_2$ | 69–74 |
| $Al_2O_3$ | 1–4 |
| $Na_2O$ | 13–16 |
| $K_2O$ | |
| $CaO$ | 7–13 |
| $MgO$ | |

However, it is to be understood that many other base glasses are suitable for the practice of this invention.

The effectiveness of silicon additions, in retaining selenium, was also shown by three 3000-pound melts of a soda-lime-silica base glass made in a commercial glass tank.

The raw batch composition of the base glass was as follows:

| Ingredient | Pounds |
|---|---|
| Sand | 1,779 |
| Soda ash | 570 |
| Burned dolomitic lime | 309 |
| Feldspar | 342 |
| Total | 3,000 |

Additions made to each batch, temperature after charging, and melting times were as follows:

| Melt No. | Additions to glass batch, percent | | | Temperature after charging, °F. | Time of melting, hours |
|---|---|---|---|---|---|
| | Se | CdS | FeSi (90% Si) | | |
| 1 | 1.0 | 0.6 | 1.0 | 2,165 | 15½ |
| 2 | .5 | .6 | .25 | 2,130 | 15½ |
| 3 | .35 | .6 | .125 | 2,175 | 15 |

A "soft" flame was employed in the day tank which was fired with natural gas. Such a flame is considered to maintain a slightly reducing atmosphere in the tank. The final melting temperature was 2750° F. in all of the tests.

The recoveries of selenium, cadmium, and sulfur were as follows:

| Melt No. | Composition of final glass, percent | | | Selenium recovery, percent | Silicon addition,[1] percent |
|---|---|---|---|---|---|
| | Se | Cd | S | | |
| 1 | 0.49 | 0.01 | 0.04 | 49 | 0.90 |
| 2 | .13 | .02 | .05 | 26 | .225 |
| 3 | .03 | .08 | .03 | 9 | .112 |

[1] Based on weight of glass batch.

Selenium recoveries of less than 5 percent are common in commercial production without silicon additions. In general, small silicon additions made it possible to reduce the selenium addition to about one-third or less of the amount normally required.

In selenium ruby glass, made from a soda-lime-silica type of batch, the selenium recovery increases as the silicon addition is increased. However, at the same time, the cadmium recovery is decreased. It is therefore important to balance the addition of selenium, cadmium sulfide and silicon so as to achieve the desired result. The selenium added will range from effective amounts to 1 percent by weight, the cadmium sulfide added will range from effective amounts to 1 percent by weight, and the silicon added will range from effective amounts up to 1 percent by weight.

The final glass will have present in it silica, a portion of which will have been produced by the oxidation of metallic silicon originally added to the glass batch.

It will be apparent from the above that our invention minimizes the loss of selenium from glass batches during the melting and fining operations. By incorporating silicon in glass batches, according to our invention, the batch can be melted and fined in continuous tank units without excessive loss of selenium. This is particularly important in the production of selenium ruby glass. Furthermore, because of our invention, it is not necessary to employ expensive base glasses in producing ruby glass. According to our invention, the selenium can be retained effectively in glass batches without depending upon a reducing gaseous atmosphere in the furnace above the glass during the melting and fining operations.

Various other advantages will be apparent from the preceding description and the following claims.

Having thus described our invention, what we claim is:

1. A method of retaining selenium in glass during processing from the batch stage to the time of fabrication of the final article which comprises incorporating in the glass batch in conjunction with the selenium a material selected from the group consisting of silicon, silicides, silicon carbide, and alloys containing silicon.

2. A method of retaining selenium in selenium ruby glass during processing from the batch stage to the time of fabrication of the final article which comprises incorporating in the glass batch in conjunction with the selenium a material selected from the group consisting of silicon, silicides, silicon carbide, and alloys containing silicon.

3. A method of adding selenium to glass which comprises adding the selenium in conjunction with a material containing metallic silicon.

4. A method according to claim 3 wherein the material is ferrosilicon.

5. A method of increasing the recovery of selenium in glass which comprises adding to a glass batch selenium together with a material containing metallic silicon, the silicon addition being made in amounts ranging from effective amounts up to 1.0 per cent of the glass batch.

6. A method of making a silica-containing selenium glass wherein a portion of the silica has been produced by the oxidation of metallic silicon originally added to the glass batch.

7. A method of increasing the recovery of selenium in glass which comprises adding to a glass batch selenium in effective amounts up to 1 per cent, together with silicon in effective amounts up to 1 per cent.

8. A method according to claim 7 wherein cadmium sulfide is also added in effective amounts up to 1 per cent.

9. A glass batch containing selenium and a material selected from the group consisting of silicon, silicides, silicon carbide, and alloys containing silicon.

10. A glass batch containing selenium in amounts ranging from effective amounts to 1 per cent and a material selected from the group consisting of silicon, silicides, silicon carbide, and alloys containing silicon in effective amounts up to 1 per cent.

11. A glass batch according to claim 10 which contains cadmium sulfide in effective amounts up to 1 per cent.

12. A glass batch containing selenium and a material containing metallic silicon.

13. A glass batch according to claim 12 wherein the material is ferrosilicon.

14. A glass batch containing selenium together with a material containing metallic silicon, said material being present in amounts ranging from effective amounts up to 1 per cent of the glass batch.

15. A method of adding selenium to glass which comprises adding the selenium in conjunction with an oxidizable silicon-containing material.

16. A glass batch containing selenium and an oxidizable silicon-containing material.

17. A glass batch containing selenium and ferrosilicon.

18. The method of adding selenium to glass which comprises adding the selenium in conjunction with a material selected from the group consisting of silicon, silicides, silicon carbide, and alloys containing silicon.

ARNOLD E. PAVLISH.
CHESTER R. AUSTIN.